(12) United States Patent
Sierro et al.

(10) Patent No.: US 9,039,843 B2
(45) Date of Patent: May 26, 2015

(54) CLEANING SYSTEM FOR A BEVERAGE MACHINE, PREFERABLY A COFFEE MACHINE

(75) Inventors: Dominique Sierro, Euseigne (CH); Frank Rimpl, Sion (CH); Jean-Paul In-Albon, Ardon (CH); Bernhard In-Albon, Uvrier (CH); Hubert Bruttin, Flanthey (CH)

(73) Assignee: Eversys Holding SA, Ardon (CH)

( * ) Notice: Subject to any disclaimer, the term of this patent is extended or adjusted under 35 U.S.C. 154(b) by 8 days.

(21) Appl. No.: 13/805,002

(22) PCT Filed: Jun. 21, 2011

(86) PCT No.: PCT/EP2011/003064
§ 371 (c)(1),
(2), (4) Date: Jan. 16, 2013

(87) PCT Pub. No.: WO2011/160817
PCT Pub. Date: Dec. 29, 2011

(65) Prior Publication Data
US 2013/0112231 A1 May 9, 2013

(30) Foreign Application Priority Data

Jun. 24, 2010 (CH) .................... 01031/10

(51) Int. Cl.
*A47J 31/60* (2006.01)
*B08B 3/04* (2006.01)

(52) U.S. Cl.
CPC . *B08B 3/04* (2013.01); *B08B 3/042* (2013.01); *A47J 31/60* (2013.01)

(58) Field of Classification Search
CPC ............ A47J 31/60; B08B 3/04; B08B 3/042
USPC ....... 134/56 R, 93, 104.1, 132; 222/148, 412, 222/651
See application file for complete search history.

(56) References Cited

U.S. PATENT DOCUMENTS

| | | | |
|---|---|---|---|
| 2,705,835 A * | 4/1955 | Massmann | 425/171 |
| 6,786,356 B2 | 9/2004 | Geiger et al. | |
| 2002/0083543 A1 | 7/2002 | Geiger et al. | |
| 2004/0011569 A1* | 1/2004 | Klijn | 177/119 |
| 2009/0183754 A1 | 7/2009 | Vetterli et al. | |
| 2009/0293733 A1 | 12/2009 | Martin et al. | |

FOREIGN PATENT DOCUMENTS

EP 1210894 A1 6/2002
EP 2078481 A1 7/2009

* cited by examiner

*Primary Examiner* — Joseph L Perrin
*Assistant Examiner* — Levon J Shahinian
(74) *Attorney, Agent, or Firm* — Brian Roffe

(57) ABSTRACT

The invention relates to a cleaning system for coffee machines, comprising a cleaning device for periodically cleaning the coffee- and/or milk-carrying components using a cleaning liquid, which contains cleaning agent in the form of balls or tablets dissolved therein, wherein the cleaning device is provided with a time- and/or product-cycle-dependent controller and a metering apparatus (1) for the cleaning agent (10) that interacts with the controller. Thus, it is possible to program the cleaning process in a customized manner according to the mode of operation and to carry out the cleaning process fully automatically according to the program. The metering of the cleaning agent (10) according to the program ensures an always optimal cleaning effect together with sparing use of cleaning agents. Simple and safe handling is achieved by using ball- or tablet-shaped cleaning agents.

21 Claims, 2 Drawing Sheets

CLEANING SYSTEM FOR A BEVERAGE MACHINE, PREFERABLY A COFFEE MACHINE

FIELD OF THE INVENTION

The invention relates to a cleaning system for a beverage machine, preferably a coffee machine, for producing coffee or drinks containing coffee, milk, milk froth or the like, comprising a cleaning device for periodically cleaning the components coming into contact with the drinks with a cleaning liquid which contains cleaning agent dissolved therein.

BACKGROUND OF THE INVENTION

This type of cleaning system is used both during operation of the machine and after shutting it down to free the coffee- and milk-carrying components of product remains deposited or stuck in the latter or of other impurities and to ensure that the machine always operates under impeccably hygienic conditions.

With the previously known cleaning systems of this type it is disadvantageous that they do not enable automatic adaptation of the cleaning performance to the respective operating conditions.

OBJECTS AND SUMMARY OF THE INVENTION

The object underlying the invention is to avoid these disadvantages and to provide a cleaning system of the type specified at the start with which the cleaning of the machine can be implemented fully automatically with a respectively optimised cleaning performance in all phases of operation.

This object is achieved according to the invention in that the cleaning device is provided with a time- and/or product-cycle-dependent controller and a metering apparatus for the cleaning agent that interacts with the controller. Thus, it is possible to programme the cleaning process in a customized manner according to the mode of operation and to carry out the cleaning process fully automatically according to the programme. Here the cleaning performance is controlled by the metering of the cleaning agent according to the programme such that it ensures an always optimal cleaning effect together with sparing use of cleaning liquid and cleaning agents.

Furthermore, the invention makes provision such that the cleaning agents are in the form of balls or tablets, by means of which simple and safe handling of the cleaning agent is achieved. Furthermore, a metering apparatus with a preferably electronically monitored metering cabinet is provided which releases the cleaning balls or tablets by interacting with the time- and/or product-cycle-dependent controller.

Since the cleaning balls or tablets contain a precisely defined amount of cleaning active agents, the number of released balls or tablets corresponds precisely to the amount of cleaning agent that is optimal for the respective mode of operation. It is thus possible to optimise the active substance concentration of the cleaning liquid automatically.

It is advantageous here within the framework of delay-free functioning of the apparatus if the metering cabinet is monitored by a light barrier or a micro-switch.

The invention also makes provision such that the metering apparatus is provided with a storage container and a dispensing chute comprising a metering opening for the cleaning balls or tablets, there being positioned between the storage container and the dispensing chute two metering screws driven in opposite directions by means of which the cleaning balls or tablets are conveyed individually into the dispensing chute. Thus the removal and conveyance of the balls or tablets from the storage container to the dispensing chute is brought about with just a few moveable components.

It is also possible for the packaging of the cleaning balls or tablets to be used at the same time as the storage container.

It is advantageous here for accurate metering if the metering volume is measured between the two metering screws such that only one ball or tablet is conveyed through the metering opening of the dispensing chute for each turn.

Within the framework of a structurally simple design provision is made according to the invention such that the storage container is provided with an open bottom and a removeable cover, and has on the lower side a housing fastened to the latter with the two metering screws on which the dispensing chute with the metering cabinet is flange-mounted.

The drive motor for the metering screws advantageously has a cylindrical worm positioned between the latter on the face side by means of which the two metering screws can be turned in opposite directions.

It is also advantageous for the purpose of an easy-to-fit design if the storage container is preferably provided on the end of the metering screws facing away from the drive motor with a plug part for a plug part, corresponding to the latter, of the control device.

BRIEF DESCRIPTION OF THE DRAWINGS

In the following the invention will be described in more detail using an exemplary embodiment with reference to the drawings.

These show as follows.

DETAILED DESCRIPTION OF THE INVENTION

Figure 1:
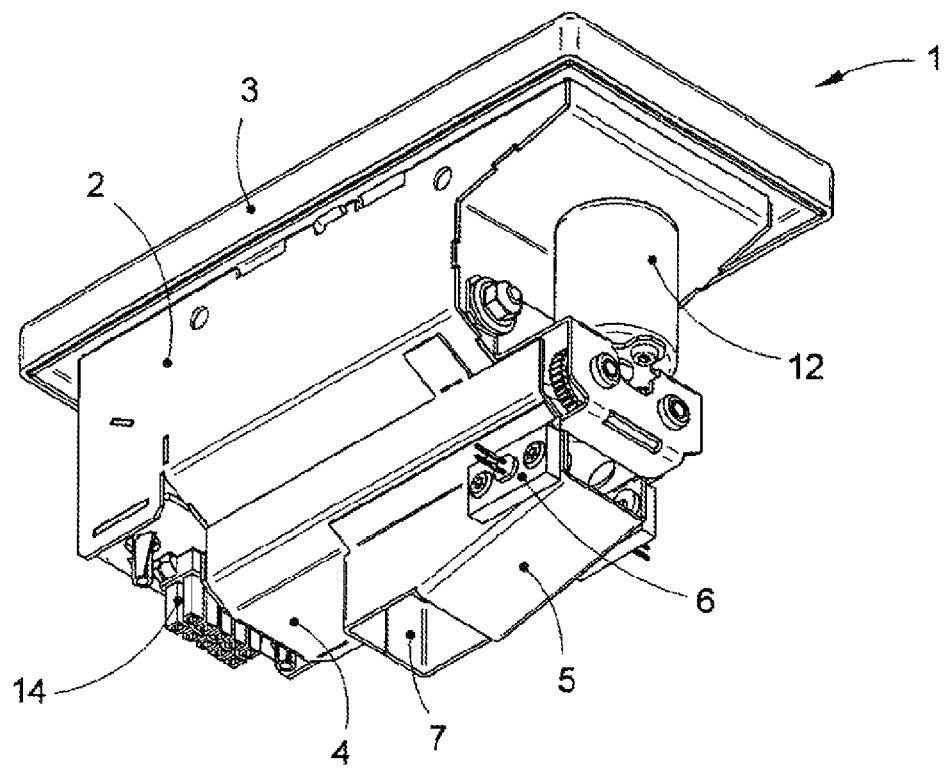
FIG. 1 is a metering apparatus for the cleaning system according to the invention, shown perspectively.
Figure 2:
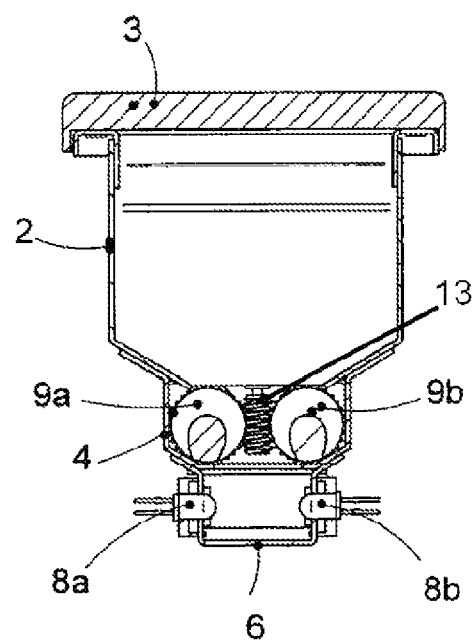
FIG. 2 is the metering apparatus from FIG. 1, shown in cross-section.
Figure 3:
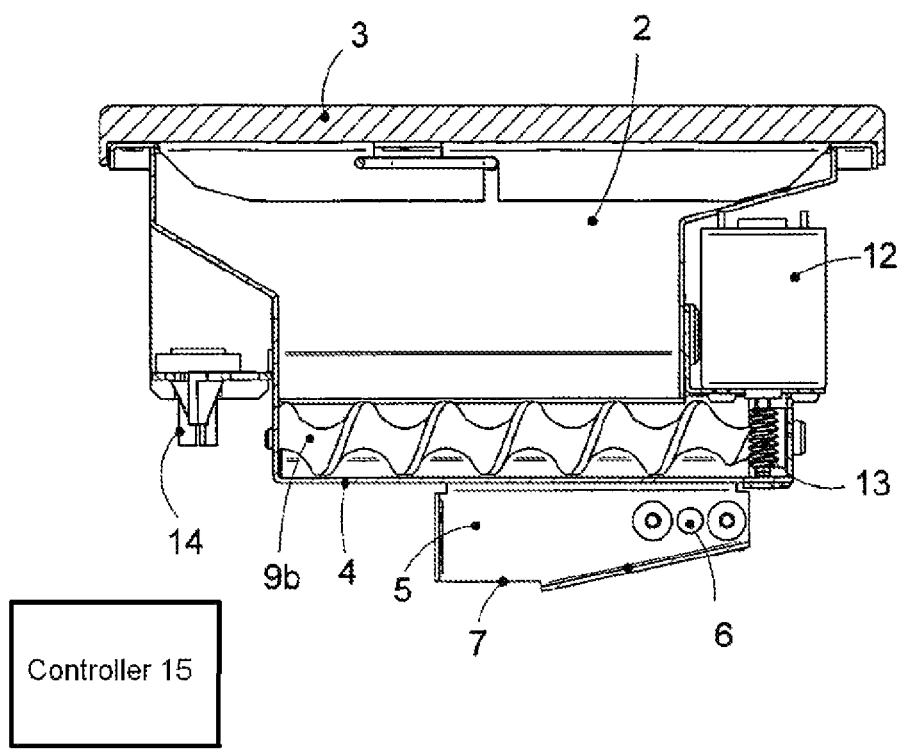
FIG. 3 is the metering apparatus from FIG. 1, shown in longitudinal section.
Figure 4:
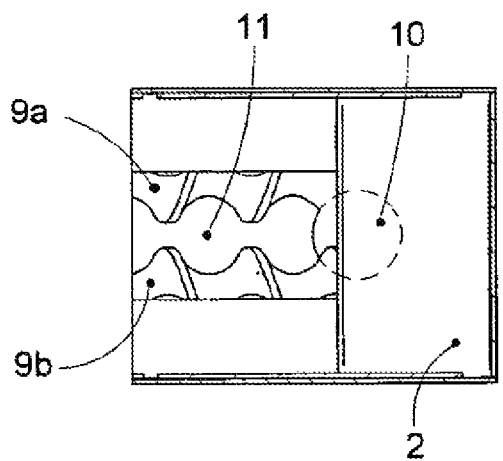
FIG. 4 is a detail of the metering apparatus from FIG. 1, shown in a top view.

The metering apparatus shown in FIG. 1 to FIG. 4 has a storage container 2 that is provided with an easily removeable cover 3 and to which a housing 4 with a dispensing chute 5 is fastened. A metering cabinet 6 and a metering opening 7 are positioned in the dispensing chute 5. The metering cabinet 6 can be operated electronically by a light barrier 8a, 8b. It can also be operated by means of a micro-switch.

The metering apparatus 1 is designed to meter ball-shaped cleaning agents. The cleaning balls 10 are kept in the storage container 2. The cover 3 placed on top can be easily removed in order to refill the container.

There are arranged in the housing 4 two metering screws 9a, 9b lying parallel to one another which serve to hold the cleaning balls 10 in their spaces 11 and to convey them to the dispensing chute 5. For this purpose the metering screws 9a, 9b are driven on the face side by an electric motor 12 with a cylindrical worm 13 by means of which the metering screws 9a, 9b can be turned in opposite directions. With the latter the metering volume of the spaces 11 has dimensions such that only one cleaning ball is conveyed through the metering opening 7 for each turn. Since all of the cleaning balls contain exactly the same amount of active substance, in this way the amount of cleaning agent respectively delivered to the cleaning liquid can be metered accurately by means of the number of balls dispensed.

This number is defined and counted mechanically, electromagnetically or electronically with the aid of a time- and product-cycle-dependently operating controller 15 of the cleaning device. Since this controller 15 is made up otherwise of generally known control means such as actuation and programming buttons, sensors, switches and similar elements, it is not necessary to discuss them in any more detail.

The operating elements for the controller are generally accommodated in an easily accessible and clearly laid out operating panel of the coffee machine. The control leads for the metering apparatus 1 are brought together in a plug part that corresponds to a plug part 14 of the metering apparatus 1. This is also accommodated such as to be easily accessible on the end of the metering screws 9a, 9b facing away from the drive motor 12. By connecting the metering apparatus to the control device with the aid of the plug part 14 fitting and removal of the apparatus is greatly facilitated.

The metering apparatus 1 forms a compact and space-saving unit which can also be easily fitted into existing coffee machines. It is also possible to provide separate metering apparatuses for the coffee-carrying components and for the milk-carrying components.

It is also easily possible within the framework of the invention to use tablets instead of balls as the cleaning agents, in both cases the metering of the latter also being able to be implemented by a lifting magnet.

By using metering screws with the respectively corresponding intermediate space it is furthermore possible to use cleaning balls or tablets of different sizes. Needless to say cleaning balls or tablets with different compositions can also be used.

The invention claimed is:

1. A metering apparatus for a cleaning system of a beverage machine that produces coffee and drinks containing coffee, milk or milk froth, comprising:
    a storage container;
    a plurality of cleaning balls or tablets arranged in said container, each of said cleaning balls or tablets containing the same amount of active cleaning substance;
    a dispensing chute that dispenses said cleaning balls or tablets into the cleaning system; and
    first and second metering screws positioned between said container and said dispensing chute and that control conveyance of said cleaning balls or tablets from said container to said dispensing chute,
    said first screw being rotatable in a first direction of rotation and said second screw being rotatable in a second direction of rotation opposite to the first direction of rotation in which said first screw is rotatable,
    said first and second screws being controlled to rotate and individually transfer each of said cleaning balls or tablets to said dispensing chute,
    said first and second screws being spaced apart from one another to define a plurality of spaces therebetween,
    each of said cleaning balls or tablets having a size relative to a size of said spaces between said first and second screws such that each of said plurality of spaces receives and holds only one of said cleaning balls or tablets at any time.

2. The metering apparatus of claim 1, wherein said container comprises a removable cover.

3. The metering apparatus of claim 1, wherein said dispensing chute includes a metering cabinet and a metering opening.

4. The metering apparatus of claim 3, wherein said first and second screws are rotated to cause a defined number of said cleaning balls or tablets to be conveyed through said metering opening for each rotation of said first and second screws.

5. The metering apparatus of claim 3, wherein said first and second screws are rotated to cause only a single one of said cleaning balls or tablets to be conveyed through said metering opening for each rotation of said first and second screws.

6. The metering apparatus of claim 3, further comprising a light barrier that monitors said metering cabinet.

7. The metering apparatus of claim 3, further comprising a time- and/or product-cycle-dependent controller, said metering cabinet being electronically monitored to release said cleaning balls or tablets by interacting with said time- and/or product-cycle-dependent controller.

8. The metering apparatus of claim 3, wherein said first and second screws are configured and controlled such that only a single one of said cleaning balls or tablets is conveyed through said metering opening of said dispensing chute for each turn of said first and second screws.

9. The metering apparatus of claim 3, wherein said container has an open bottom, further comprising a housing on a lower side of said container, said first and second screws being arranged in said housing at least partly below said open bottom of said container, said metering cabinet being arranged below said housing.

10. The metering apparatus of claim 1, wherein said first and second screws lie parallel to one another.

11. The metering apparatus of claim 1, further comprising rotation means for rotating said first and second screws in opposite directions of rotation.

12. The metering apparatus of claim 11 wherein said rotation means comprise a cylindrical worm and an electric motor that rotates said cylindrical worm to cause rotation of said first and second screws.

13. The metering apparatus of claim 12, further comprising a plug part receiving control leads for the metering apparatus, said plug part being situated on an opposite side of said first and second screws from said motor.

14. The metering apparatus of claim 12, wherein said cylindrical worm is positioned between said first and second screws.

15. The metering apparatus of claim 1, wherein said container has an open bottom, further comprising a housing on a lower side of said container, said first and second screws being arranged in said housing at least partly below said open bottom of said container such that said cleaning balls or tablets pass through said open bottom of said container into engagement with said first and second screws.

16. The metering apparatus of claim 15, wherein said housing is fastened to said container.

17. The metering apparatus of claim 15, wherein said dispensing chute is flange-mounted to said housing.

18. The metering apparatus of claim 1, wherein said dispensing chute includes a metering opening arranged below said first and second screws.

19. The metering apparatus of claim 1, wherein said dispensing chute is arranged below said first and second screws such that each of said cleaning balls or tablets is removed from engagement with said first and second screws and drops into said dispensing chute.

20. A metering apparatus for a cleaning system of a beverage machine that produces coffee and drinks containing coffee, milk or milk froth, comprising:
    a storage container for containing cleaning balls or tablets;
    a dispensing chute that dispenses the cleaning balls or tablets into the cleaning system;

first and second metering screws positioned between said container and said dispensing chute and that control conveyance of the cleaning balls or tablets from said container to said dispensing chute, said first screw being rotatable in a first direction of rotation and said second screw being rotatable in a second direction of rotation opposite to the first direction of rotation in which said first screw is rotatable, said first and second screws being controlled to rotate and individually transfer each of the cleaning balls or tablets to said dispensing chute, said first and second screws being spaced apart from one another to define a plurality of spaces therebetween, each of said plurality of spaces being configured to receive and hold a respective one of the cleaning balls or tablets; and a wall below said first and second metering screws, said wall having an opening situated below one of said spaces between said first and second metering screws and sized to allow only one of the cleaning balls or tablets at a time to pass from said one of said spaces between said first and second metering screws that is above said opening through said opening in said wall and into said dispensing chute situated below said wall.

21. The metering apparatus of claim 20, further comprising a plurality of cleaning balls or tablets arranged in said container, each of said cleaning balls or tablets having a size relative to a size of said spaces between said first and second screws such that each of said plurality of spaces receives and holds only one of said cleaning balls or tablets at any time.

* * * * *